United States Patent Office 2,750,272
Patented June 12, 1956

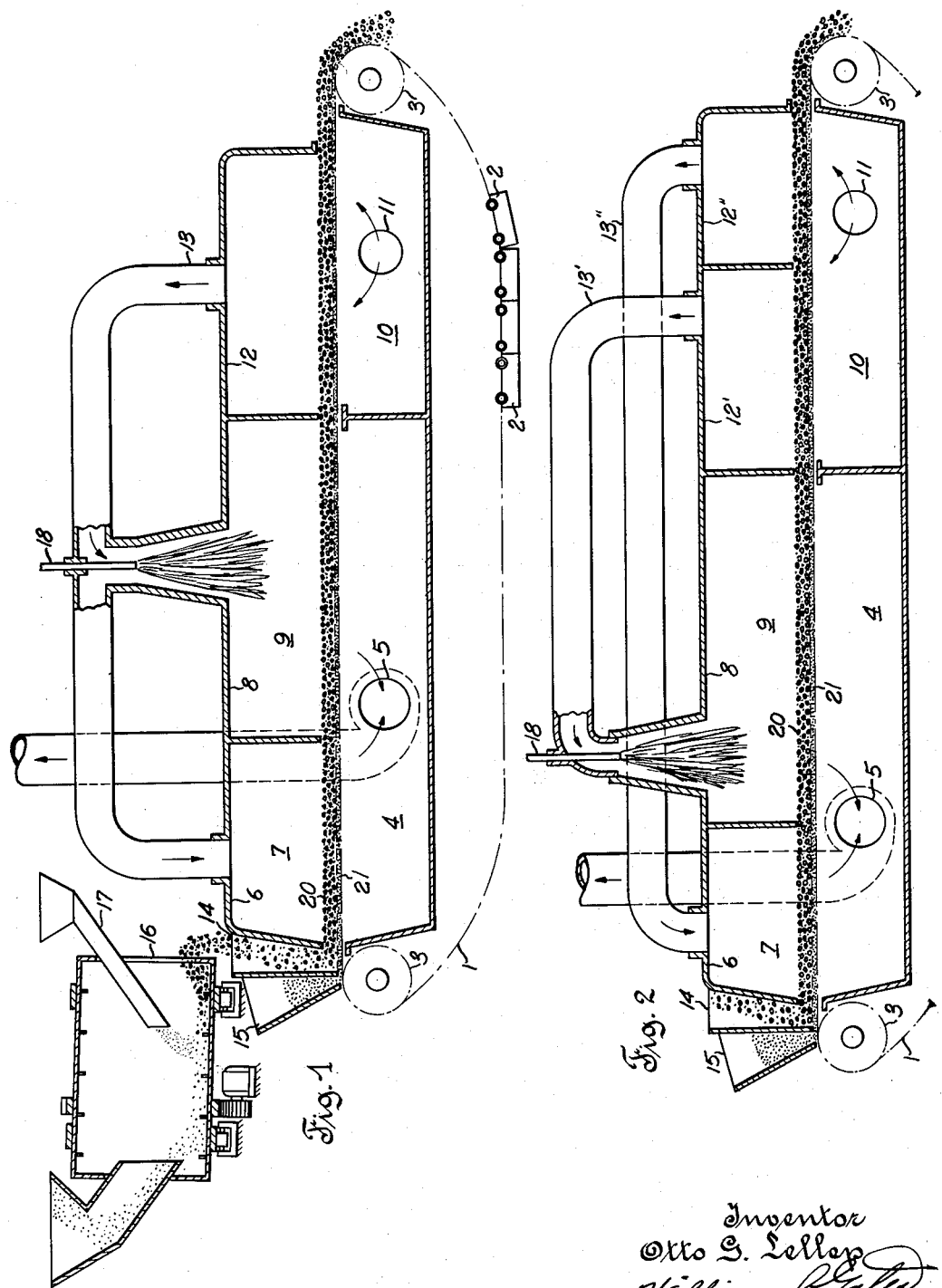

2,750,272

PROCESS FOR PRODUCTION OF HARD BURNED AGGLOMERATES OF FINE MAGNETITE ORE

Otto G. Lellep, Wauwatosa, Wis., assignor to Allis-Chalmers Manufacturing Company, Milwaukee, Wis.

Application June 5, 1950, Serial No. 166,087

3 Claims. (Cl. 75—3)

This invention relates generally to processes for agglomerating iron ores and particularly to processes for making heat-hardened, separate pellets of iron ore from finely divided oxidic iron ore and concentrates thereof, such as magnetite produced from taconites.

It is well known that fine powdery ore is unsuitable for treatment in blast furnaces, open hearth furnaces and the like used in the iron and steel industry. A number of methods have been tried, some with limited success, for agglomeration of such fine ore particles in such manner as to make them suitable for blast furnaces and other industrial equipment. Briquetting presses and extrusion pelletizers require binders which are expensive. Sintering, the most commonly used method, requires an objectionably high fuel consumption and produces a product which while rather light in bulk weight is composed of hard vitreous material as a result of sintering together of the particles at the incipient melting temperatures used, the volume of voids being large, due to the nature of the process. Pellets of ore concentrates have been burned or heat-hardened in shaft type kilns with very low heat consumption. But the shaft kiln operation is not always dependable because of difficulties in obtaining uniform charging and discharge and uniform movement of material and gases through the inaccessible interior of the shaft. These difficulties in shaft kiln operation lead to non-uniform burning, hanging of the charge and sintering together of pellets in parts of the kiln so as to hinder gas flow and promote further irregularities, such as dense overburned chunks of material and underburned pellets in other parts of the charge and a general lack of uniformity in the product.

The present invention has, as an object, the production, with a very low fuel consumption, of heat-hardened agglomerates of finely divided iron ore, consisting of sized or classified, porous, but hard and durable pellets of ore, without sintering, so as to obtain a more easily and economically reducible charge for the blast furnace or open hearth than natural lump ore and the usual sintering machine product.

A further object is to produce a hard, but porous, pelletized agglomerate of iron ore, practically free from dust and fines, to reduce dust losses and improve yield in subsequent processing.

Still another object is to heat-harden initially weak waterbound pellets of iron ore concentrates with a very low energy consumption on the order of only about 550,000 B. t. u. per long ton.

A still further object of the invention is to heat-harden agglomerates of iron ore without sintering and "sprouting" which would increase the heat consumption and make a product more difficult to reduce.

Another object is to heat-harden clean pellets free of fines in a thick layer on a gas-permeable grate with a resulting saving in power required for blowing, cooling and drying as compared with a layer of fine unpelletized material such as is ordinarily handled in sintering practice.

The process has as a starting material finely ground iron ore concentrates in a moist condition, such as are generally produced by known iron ore beneficiation processes, more particularly magnetic concentration of magnetic taconites and flotation of nonmagnetic ores.

The finely ground moist ore concentrates are readily formed into small agglomerates or green waterbound pellets by such apparatus as applicant's previously patented balling or pelletizing drum fully described in U. S. Patent No. 1,994,718. The pelletization is controlled, and the product preferably sized, so as to produce small ball like green pellets in sizes ranging from one-quarter inch to one inch in diameter. Similar green pellets may be formed in any other suitable known manner, as by briquetting or extrusion processes, and the like; but these may require a binder or plasticizer other than water. It is preferred, in this stage of the process, to produce fairly uniformly sized green pellets; but as explained hereinbelow it will be possible, or even desirable under some conditions, to use pellets even larger than one inch in diameter.

The green pellets produced are formed into a layer upon a gas-permeable support of any known type, preferably a grate protected by a relatively thin layer of already hardened pellets such as are the final product of the process. The final product may be roughly graded, and the smaller sizes, but not fines or dust, may be used for the grate protecting layer. It has been found that a layer about twenty inches deep for both layers will give good results with green pellets averaging in size between three-eighths and three-quarters of an inch in diameter, and that if the larger pellets are segregated to the top of the layer, the top layer pellets may be one inch in diameter or slightly larger with good results. For good heat utilization, the pellet size may vary roughly in proportion to the layer depth, and the time of heating will naturally be longer for a thicker layer.

The layer of green pellets formed in the previous step is then subjected to a downdraft of moderately heated drying gases, such as air used as a cooling gas in a later part of the process cycle, heated to a temperature of about 500° F. After at least the greater part of the layer of green pellets, from the top down, has been dried, the layer is subjected to a downdraft of flame in the neighborhood of 2250° F. produced by burning fuel with preferably preheated air, which heats the pellets from the top down, rather gradually, until the temperature of the lowermost green pellets reaches approximately 1800° F. at which time the heating and hardening will be complete.

In the case of magnetite concentrates the fuel consumption in producing the flame or heating gases can be held remarkably low if highly preheated air is used for combustion and the flame is strongly oxidizing because, in the oxidizing atmosphere, the magnetite will be largely converted in a heat releasing reaction into hematitic or higher iron oxides. For pure magnetite and perfect reaction, the heat released by this reaction would be about 150 B. t. u. per pound of $Fe_2O_3$ produced. Thus if a high percentage of conversion is maintained the heat produced within the pellets may be as much as over one-half of the total outside heat required for heat-hardening the pellets. A high percentage of conversion is favored by maintaining a high concentration of oxygen in the heating flame; and this may economically be done by utilizing air preheated to high degree for flame production, such air being obtained in a first stage of cooling the heat-hardened pellets of an already heat-hardened charge of pellets. Care is taken, by control of fuel supply and draft in flame production, that the pellets shall not be heated to a temperature as high as incipient melting temperature, which for magnetite will vary according to impurities from about 2350° to 2500° F. The hardening of pellets in the present process occurs as the result of molecular attraction of particles reoriented and altered during heating at temperatures below sintering temperature, the particles being initially brought into close contact in the pelletizing step. The hardening in the present process is thus somewhat analogous to the hardening of baked clay products and does not depend upon incipient melting or sintering, which requires a higher temperature and a considerably higher fuel consumption than the present process.

The layer of pellets heated through in the previous step is, for heat economy and ease of handling, cooled by an updraft of cooling air through the layer. The most highly heated gases, produced when this charge is still at nearly its peak temperature, will be utilized in producing the flame or heating gases for heating and hardening a succeeding charge of green pellets; and more moderately heated air or gases produced in the later stage will, for reasons of heat recuperation, be utilized in drying a succeeding charge of pellets.

The pellets produced as above described may be produced at a total heat consumption of only about 550,000 B. t. u. for magnetite to about 850,000 B. t. u. for non-magnetic ores per long ton of product, and the pellets produced, although hard, durable and more readily reducible in later processing, because of a higher degree of porosity than natural ore lumps or the usual sintering machine product, will still have a greater bulk weight than the sintered product because of a smaller percentage of voids. This porosity with greater bulk weight will be an advantage in the blast furnace, as a larger tonnage, reducible with a lower coke consumption, can be handled in the limited volume of a given furnace.

For convenience and clarity the process will be further described as proposed to be continuously carried out on equipment of the traveling grate type shown schematically in the drawing. Fig. 1 shows, in vertical longitudinal section, apparatus suitable for practicing the process; and Fig. 2 shows a similar view of another form of the apparatus. The same reference characters relate to the same or similar parts throughout the several views of the drawing.

The grate 1 is a gas-permeable grate with openings fine enough to retain the pelletized product being handled, and will preferably be of heavy cast iron bar or perforated plate construction or bars or plates of heat resistant steel, as it must withstand temperatures which may rise occasionally above 1,000° F. As shown, the grate 1 is of the same general type as is now known in the sintering machine art and consists of an endless chain of grates 1 with side plates 2 traveling over mechanically rotated supporting rolls 3 and having its upper flight supported mechanically by known structure (not shown) between the rolls 3. It will be obvious that such a grate can also be formed of a succession of cars with heat insulated side walls (not shown) with gas-permeable grate bottoms, moved either continuously or intermittently so as to form a unidirectionally traveling grate through a definite length of the path of travel.

Beneath the generally horizontal working flight of grate 1, and under the feed end, a suction box 4 is arranged with an opening 5 to an exhaust fan (not shown). Above the box 4 adjacent the feed end of the grate is a drier hood 6 extending over the grate above a portion of the length of the suction box and the sides of the grate will substantially close the space between the drier hood sides and the suction box sides, to create a drying chamber 7 through which all material on the grate 1 and between its side plates 2 must pass.

Adjacent the drier hood in the direction of grate travel is a second or firing hood 8, also over suction box 4, which with the grate sides forms a heating or burning chamber 9 through which all material on the grate must pass.

Below the grate 1, and adjacent the suction box 4 in the direction of travel of the grate, is a wind box 10 supplied with cooling air, as by a fan or blower (not shown) connected with a suitable opening 11. Air passing up through the grate 1 from box 10 is received by a cooler hood 12, arranged above the grate. This air is conducted through a preferably heat-insulated conduit 13 to the firing hood 8 and the drier hood 6 where heat absorbed in cooling burned pellets can be utilized in drying and heating green pellets.

In the modification shown in Fig. 2 the cooler hood corresponding to hood 12 is divided into two parts 12' and 12" and the conduits 13' and 13" conduct air therefrom to the firing hood 8 and drier hood 6, respectively.

A pair of hoppers 14 and 15 are arranged to discharge layers of pellets of measured depths on the grate 1 in a manner well known. Green pellets of proper sizes described hereinabove are supplied to hopper 14 and burned pellets, preferably of smaller sizes are supplied to hopper 15 to form a grate protecting layer. The green pellets are continuously produced, as in a pelletizing drum 16 supplied with moist iron ore concentrates. A suitable chute 17 may be utilized to supply dry burned fines obtained by a final screening of the product, if desired, the addition of these fines, promoting the discharge of suitably hard and non-sticky green pellets. The pellets discharged from drum 16 preferably will be graded in any suitable known manner and any fines and undersized pellets will be recirculated through the pelletizing apparatus.

Fuel such as gas, oil or powdered coal or the like will be supplied to firing hood 8 through a suitable burner pipe 18, in regulated quantities suitable to maintain the desired temperatures. And suitable thermostatic controls of known types (not shown) may be arranged to control all draft rates and temperatures. The grate speed will be correlated to the chamber lengths so that the times required for completion of each of the steps of the process as to a given pellet will be made available.

The process, as carried out on the exemplary apparatus, may be described as follows: Green pellets produced in drum 16 or other suitable pelletizing apparatus (not shown) are transported to hopper 14 from which they are, by grate motion, discharged in a uniform layer 20 of suitable depth, preferably superimposed on a layer 21 of already heat-hardened pellets discharged on the grate by hopper 15 at the feed end of grate 1. The layer 20 is carried by the grate through the chamber 7, where moderately heated gases are drawn down through and between the pellets to dry them gradually and without any cracking or disintegration due to steam formation. This can be done at a drying chamber temperature of about 500° F. From chamber 7 the now dried green pellets pass into chamber 9 where they are subjected to heating by a downward current of highly heated gases produced by combustion of fuel in a heated air supply under the firing hood 8. Here in chamber 9 the topmost pellets, preferably the largest, will become heated to a peak temperature in the neighborhood of 2250° F. before they pass out of chamber 9, while the lowermost of the green pellets will have time to reach a temperature of about 1800° F., the heating being promoted, in the case of magnetite, by the oxidizing reaction mentioned hereinbefore.

Passing beyond the chamber 9 the pellets will be subjected to a blast of cooling air from wind box 10, which will begin the cooling of the pellets, to be continued during their passage over the wind box 10. Air heated by heat exchange in the cooling of hot pellets passing upward through the layer over the wind box will be conducted by conduit 13, 13′ and 13″ to the firing and drier hoods 8 and 6, the hotter gases produced at the leading end of the cooling chamber as at receiver 12′, preferably being carried to the firing hood 8, while the more moderately heating air produced in the later stages of cooling near the discharge end of the grate are preferably carried by conduit 13″ to the drier hood 6.

The fact that sintering and "sprouting" are prevented by maintaining temperatures below the incipient melting temperature of the ore and avoiding the use of excessive quantities of carbon fuel in intimate contact with the ore particles, results in easy blowing and in the production of suitably hardened and porous but separate pellets which are readily discharged from the grate as a finished product in a condition for easy grading and transportation, there being no large lumps of pellets or chunks sintered or cemented together, such as would be objectionable in a blast furnace or open hearth charge.

It will be readily understood that the layer formed on the grate, since it is made up of pellets not moving relative to the grate, will be and remain uniform as to thickness and distribution of voids and hence will be easy to blow uniformly, heat uniformly and cool uniformly, with a maximum of heat economy.

Waste gases will be discharged by the exhaust fan or other draft producing device (not shown) connected with the suction box 4 at opening 5.

It will be further understood that if it is desired for any reason to produce larger pellets on the order of an inch and a quarter in diameter, for example, for sponge iron production by known methods, deeper layers of pellets, on the order of up to three and one-half feet may be formed. It may be desirable at such depths to use a grate formed of a train of intermittently or continuously moving cars as mentioned above. The pellets also may vary in shape, prismatic or cylindrical shapes being usable, although the round ball shape appears more convenient.

The heat consumption from fuel when heat-hardening magnetic pellets will be around 550,000 B. t. u. per long ton of ore. Nonmagnetic iron oxide ores may also be treated by the process but the heat requirement will be about 800,000 B. t. u. per long ton for these ores because there will be no heat produced by oxidation of lower iron oxides in such ores.

Example: Finely divided magnetite ground to a fineness such that a large part passed through two hundred mesh and containing about 8% of moisture was formed into green pellets of an average size of about five-eighths inch diameter by known pelletizing procedure. The pellets were charged onto a gas-permeable grate in a layer about twenty inches deep including about five inches of burned pellets. Air at about 500° F. was drawn down through the layer for ten minutes, drying the green pellets; subsequently the charge was fired at a hood temperature of about 2250° F. for about twelve minutes, raising the temperature of the lowermost green pellets to at least 1800° F. After this, the gas flow is reversed, with a blast of cooling air passing upwardly through the charge for about twenty minutes, at which time the pellets were ready for discharge at temperatures below 800° F., the cooling air being heated in the cooling process to temperatures suitable for flame production in the heating step and drying in the drying step. Porous hardened pellets highly suitable for transportation and blast furnace use were produced with a calculated net heat consumption in the neighborhood of 500,000 B. t. u. per long ton of product.

It will be understood that the process of the present invention will be subject to some variations and modifications without departing from the spirit of the invention, and that it is not limited precisely to the temperatures and quantities mentioned by way of illustration but only by the scope of the appended claims.

It is claimed and desired to secure by Letters Patent:

1. A process for making hard, porous, unsintered, separate pellets of iron ore from finely divided oxidic iron ore, said process comprising the steps of making moist green pellets of iron ore from said finely divided ore, forming said green pellets into a uniformly thick, generally horizontal, gas-permeable layer of pellets on a support, establishing first, second and third gas confining zones, effecting a flow of moderately heated gases through said first zone, effecting a flow of highly heated strongly oxidizing gases through said second zone independently of the first said flow and effecting a flow of cooling gases through said third zone, translating said layer of pellets as a body generally horizontally successively through said zones in the order named to afford said gases a passage through said gas-permeable layer and its support in a direction generally normal to the direction of translation of said layer to effect a heat transfer between said gases and said layer, correlating the temperature of said oxidizing gases and the rate of pellet layer translation through said second zone to effect hardening of said pellets at a peak temperature of approximately 2250° F. but below the incipient melting temperature of said ore, and utilizing the heat exchanged between said layer and said cooling gases to precondition the gases flowing through said first and second zones.

2. A process for making hard, porous, unsintered, separate pellets of iron ore from finely divided oxidic iron ore, said process comprising the steps of making moist green pellets from said finely divided ore, forming said green pellets into a uniformly thick, generally horizontal, gas-permeable layer of graded pellets on a support, establishing first, second and third gas confining zones, effecting a flow of moderately heated gases through said first zone, effecting a flow of highly heated strongly oxidizing gases through said second zone independently of the first said flow and effecting a flow of cooling gases through said third zone, translating said layer of pellets as a body generally horizontally successively through said zones in the order named to afford said gases a passage through said gas-permeable layer and its support in a direction generally normal to the direction of translation of said layer to effect a heat transfer between said gases and said layer, correlating the temperature of said oxidizing gases and the rate of pellet layer translation through said second zone to effect hardening of said pellets at a peak temperature of approximately 2250° F. but below the incipient melting temperature of said ore, and utilizing the heat exchanged between said layer and said cooling gases to precondition the gases flowing through said first and second zones.

3. A process for making hard, porous, unsintered, separate pellets of iron ore from finely divided magnetite, said process comprising the steps of making moist green pellets of iron ore from said finely divided magnetite, forming said green pellets into a uniformly thick, generally horizontal, gas-permeable layer of graded pellets of diameters within predetermined limits on a support, establishing first, second and third gas confining zones, effecting a flow of moderately heated gases through said first zone, effecting a flow of highly heated strongly oxidizing gases through said second zone independently of the first said flow and effecting a flow of cooling gases through said third zone, translating said layer of pellets as a body generally horizontally successively through said zones in the order named to afford said gases a passage through said gas-permeable layer and its support in a direction generally normal to the direction of translation of said layer to effect a heat transfer between said gases and said layer, correlating the temperature of said oxidizing gases and the rate of pellet layer translation through said second zone to effect hardening of said pellets at a peak temperature of approximately 2250° F. but below the incipient melting temperature of said magnetite, and utilizing the heat exchanged between said layer and said cooling gases to precondition the gases flowing through said first and second zones.

References Cited in the file of this patent

UNITED STATES PATENTS

| | | |
|---|---|---|
| 1,153,203 | Drefahl | Sept. 14, 1915 |
| 1,673,891 | Stehli | June 19, 1928 |
| 1,775,313 | Lellep | Sept. 9, 1930 |
| 1,865,554 | Bradley | July 5, 1932 |
| 2,131,006 | Dean | Sept. 20, 1938 |
| 2,143,905 | Ahlmann | Jan. 17, 1939 |
| 2,532,335 | Royster | Dec. 5, 1950 |
| 2,608,481 | Royster | Aug. 26, 1952 |

OTHER REFERENCES

"Powder Metallurgy," by Wulff; published by the American Society for Metals, 1942. Page 36.